United States Patent [19]

Maruno et al.

[11] Patent Number: 4,637,939
[45] Date of Patent: Jan. 20, 1987

[54] OPTICAL ADHESIVE COMPOSITION

[75] Inventors: Tooru Maruno, Hino; Kouzaburou Nakamura, Tokyo; Shigekuni Sasaki, Iruma, all of Japan

[73] Assignee: Nippon Telegraph & Telephone Public Corporation, Tokyo, Japan

[21] Appl. No.: 827,059

[22] Filed: Feb. 7, 1986

Related U.S. Application Data

[62] Division of Ser. No. 647,637, Sep. 6, 1984, Pat. No. 4,591,627.

[30] Foreign Application Priority Data

| Sep. 9, 1983 | [JP] | Japan | 58-165268 |
| Nov. 21, 1983 | [JP] | Japan | 58-217794 |
| Nov. 29, 1983 | [JP] | Japan | 58-223087 |
| Jun. 15, 1984 | [JP] | Japan | 59-121914 |
| Jun. 15, 1984 | [JP] | Japan | 59-121915 |
| Aug. 9, 1984 | [JP] | Japan | 59-167232 |

[51] Int. Cl.$^4$ ............................................. B05D 5/06
[52] U.S. Cl. ................................. 427/162; 427/163; 156/330
[58] Field of Search ............................. 427/162, 163

[56] References Cited

U.S. PATENT DOCUMENTS

| 3,340,310 | 9/1967 | Gilbert et al. | 528/87 X |
| 4,254,000 | 3/1981 | Ohmori et al. | 528/402 X |
| 4,267,302 | 5/1981 | Ohmori | 528/402 X |
| 4,343,857 | 8/1982 | Uram | 428/336 |

Primary Examiner—Earl Nielsen
Attorney, Agent, or Firm—Oblon, Fisher, Spivak, McClelland & Maier

[57] ABSTRACT

The adhesive composition or compound of the invention comprises an epoxy resin, a reactive diluent and a hardener, and at least one of said components contains fluorine atoms. The adhesive composition containing fluorine atoms, according to the invention, provides a cured or hardened composition having small refractive index due to the presence of fluorine atoms. The refractive index of the hardened product may be freely controlled within the range of $n_D{}^{23} = 1.415$ to $n_D{}^{23} = 1.570$.

The adhesive composition may be applied for the production of optical members for use in a communication system utilizing optical fibers or in a variety of optical instruments, and has improved heat resistance and adhesive property and is improved in matching of the refractive index with that of the material used for the optical member, such as optical fibers or glasses having lower refractive index used in a lens system.

1 Claim, 21 Drawing Figures

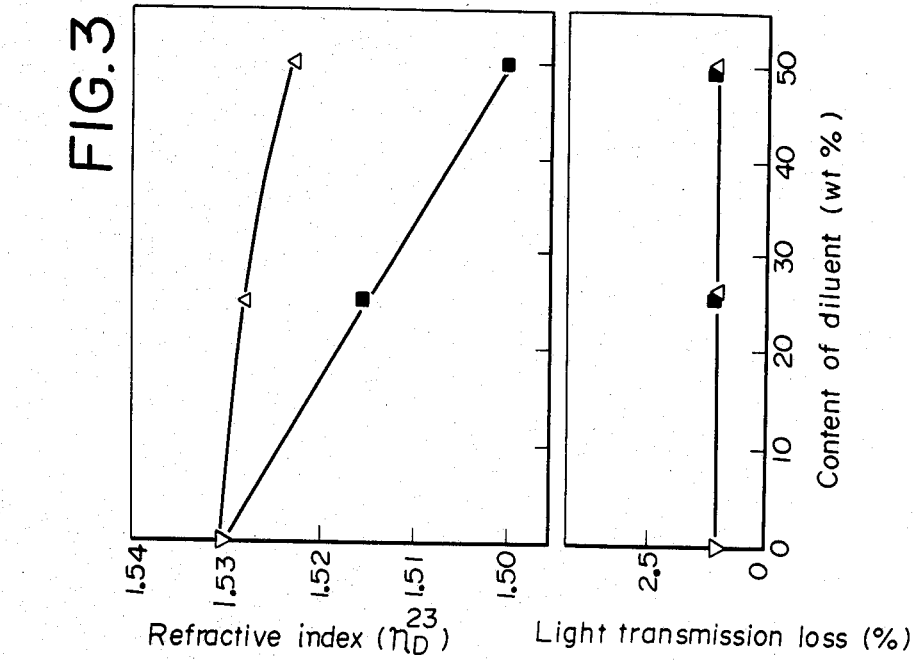
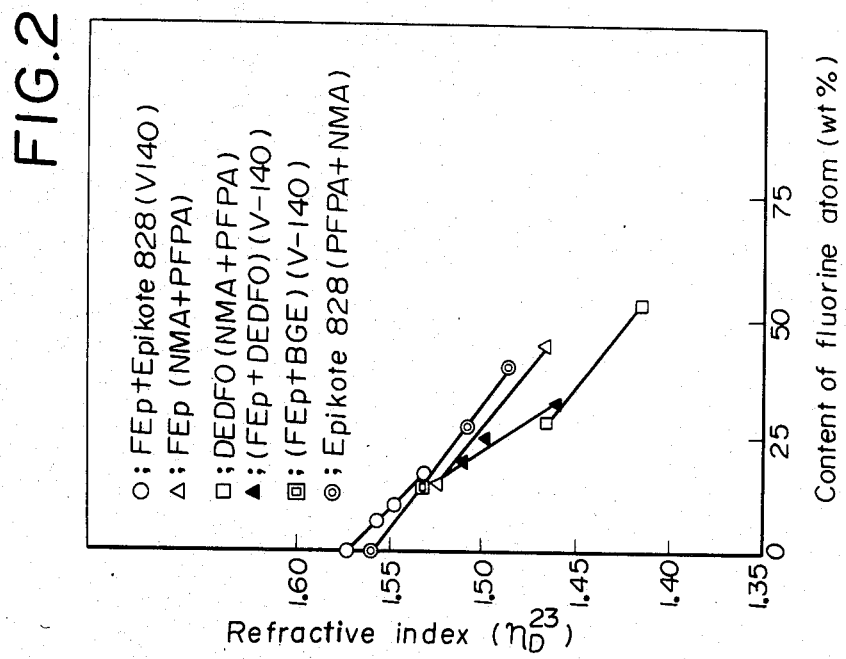

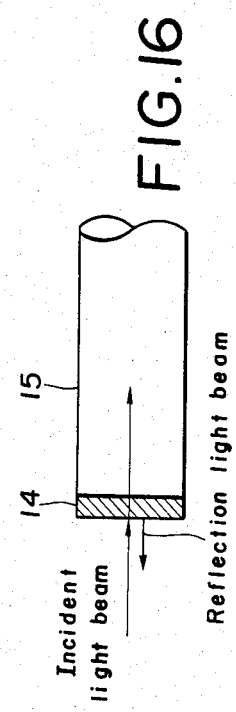
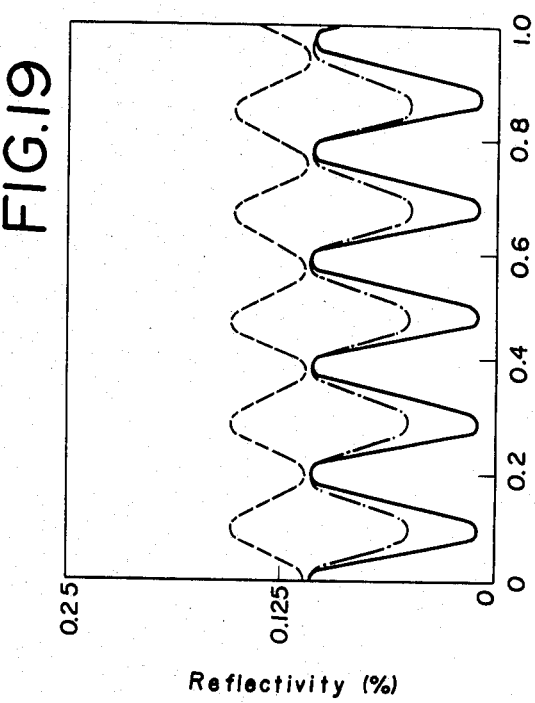
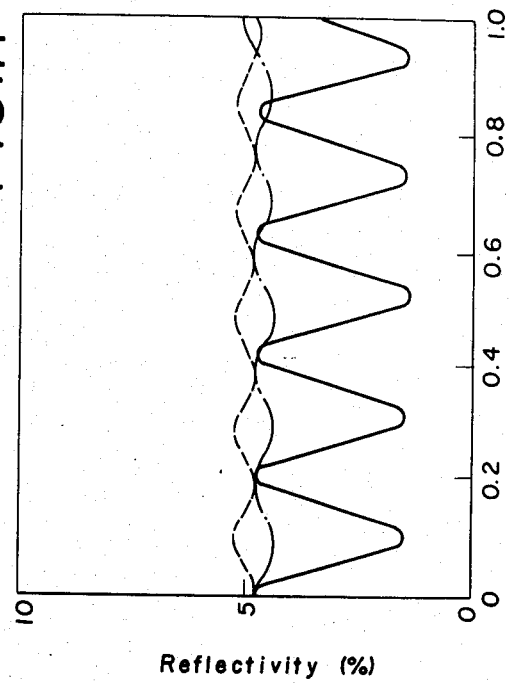

OPTICAL ADHESIVE COMPOSITION

This is a division of application Ser. No. 647,637, filed Sept. 6, 1984, now U.S. Pat. No. 4,591,627, issued May 27, 1986.

BACKGROUND OF THE INVENTION

1. Field of the Invention

The present invention relates generally to a novel adhesive composition, and more particularly to an adhesive composition or compound of fluorine-containing epoxy resin which has improved properties before and after curing and which can be controllably hardened or cured to form a cured product having a refractive index variable within the defined range in compliance with the desired design value. More specifically, it relates to an adhesive composition which may be used for the production of various optical members or parts for the applications in a communication system utilizing optical fibers.

2. Prior Art

Epoxy resins have hitherto been used for wide appliances as effective adhesives. The cured products of the adhesives containing epoxy resins are varied in their refractive indices, optical losses, adhesive strengths, flexibility and heat resisting properties extensively depending on the used epoxy resin and the combined hardeners or curing agents.

Amongst the known epoxy resins, the bisphenol-A type epoxy resins were predominantly used to form cured compositions having excellent adhesive and heat-resisting properties in combination with proper fillers and/or coupling agents. In order to further improve the flexibility of the cured products, other type epoxy resin adhesives containing epoxy resins derived from polyglycols have been developed. On the other hand, an adhesive composition added with a low viscosity diluent has been developed to lower the viscosity of the composition prior to the curing step and to facilitate defoaming after the addition of a hardener. Also developed was an adhesive composition in which an amine base hardener was used for lowering the curing temperature or for decreasing the time required for curing.

However, these known adhesive compositions have disadvantages that they have too high refractive indices not to match with those of optical members made of quartz fibers or a glass having a low refractive index, such as the BK7 glass (Borosilicate Crown glass mainly composed of $SiO_2$, $Ba_2O_3$, $Na_2O$ and $K_2O$) or $KZF_2$ glass (Antimony Flint glass mainly composed of $SiO_2$, $Ba_2O_3$, $Na_2O$ and $Sb_2O_3$) having low refractive indices to make it impossible for matching the refractive indices thereof when they are used as adhesives for adhering such optical members together. If the optical members are joined together by the use of any one of the aforementioned known adhesives, the reflection of the optical signal at the extremities of the optical members is increased to the extent that the strength of the signal is lowered too much to induce unstable operation of a light emitting element (e.g. a laser diode) disposed adjacent thereof. The adhesive compositions containing aforementioned bisphenol-A type epoxy resins have a disadvantage that the viscosities thereof in the uncured condition are too high.

Moreover, it is extremely difficult to suppress the optical transmission loss when a filler or binder is added to any one of the aforementioned resin compositions, and it also caused the reduction in flexibility or elasticity of the resultant cured composition. On the other hand, the heat-resisting property of the cured composition might be adversely affected by the addition of a low viscosity diluent.

It has been also known in the art that the adhesives containing epoxy resins derived from polyglycols are inferior in resistance to heat and low in adhesive strength. Particularly, it has been extremely difficult to prepare an adhesive composition excellent both in heat-resisting property and in flexibility by the use of the known epoxy resins.

Furthermore, when an adhesive composition is incorporated in an optical passage, scattering and/or reflection of the transmitted or travelling lights are promoted, leading to increase in optical loss, if foams are left in the cured resin composition. In order to minimize such optical loss, the resin composition must be defoamed completely after the step of adding and mixing with the curing agent or hardener. However, the conventional resin compositions can be hardly defoamed within the pot life time thereof after the resin systems are mixed with the curing agents or hardeners. It was, therefore, requisite and indispensable to mix the compositions in a special equipment so as not to form small foams or bubbles at the mixing step. It has been known to mix the resin composition in vacuum to obviate formation of air bubbles which are often left in the mixed composition to be incorporated in an optical passage. However, such process is cumbersome and requires the use of expensive devices.

In the art of manufacturing optical members, it has been known to use a so-called silicone oil, i.e. oily polysiloxane, to match the refractive indices of the joined parts. For instance, a silicone oil is used for joining optical fiber elements for the purpose of matching the optical indices. However, such a silicone oil is a liquid having some fluidity, and hence a container for preventing the used silicone oil from flowing out of the applied portion must be used to seal the matched portion. However, such a method adopted in the prior art for the matching of refractive indices includes complicated and troublesome operations with low yield. Moreover, the durability and/or reliability of the products processed through the method could not be insured.

When a laser diode is used and attached to one end of an optical fiber system, the reflected light enters into the laser diode to generate noises in the laser diode. It has been a common practice to deliberately dislocate the end of the optical fiber system relative to the laser diode thereby to differ the angle of incidence a little from zero, in other words, to couple the optical fiber system with the laser diode in a slightly dismatching interrelation for preventing the light reflected at the end face of the optical fiber system from returning back in the laser diode. As a result, it is impossible to maximize the transmitted light intensity by the use of the known adhesive composition. Accordingly, there is a demand for an improved adhesive composition having an extremely low reflectivity and well adapted for matching of the refractive index.

To solve the aforementioned problem, it has hitherto been proposed the use of an adhesive composition which may be adapted for the matching in refractive index in optical systems. However, almost all of the known adhesive compositions have refractive indices ($n_D^{23}$) ranging within 1.54 to 1.60, which are relatively high when comparing to those of the quartz glass ($n_D^{23}=0.46$) and the BK7 glass ($n_D^{23}=1.5164$). The measurement of refractive index is carried out at 23° C. Therefore, when such a known adhesive composition is used in an optical system wherein a number of optical members having relatively low refractive indices in used or applied, the optical loss at the transmission interface is increased due to increase in quantity of reflected light entering into the input side.

Further disadvantages of the known adhesive compositions are that they are unsatisfactory in their wettabilities to the optical members, and they are inferior in percent transmission (transmission factor), adhesive strength and resistance to heat. It is, thus, required to provide an adhesive composition which satisfies all of the aforementioned requirements for matching the refractive indices.

Recently, it is contemplated to establish an optical communication service network. To realize such contemplation, it is necessary to develop optical members used in a laser diode module, APD module (avalanche photodiode module) and an optical coupler. In assembly of the optical members, binders including solders or adhesives, are used at close positions in some cases. Although either one of a solder or an adhesive may be used for the purpose other than the fixation of the optical passages, a transparent adhesive must be used for the fixation in the optical passage. For this reason, development of an improved adhesive composition having high transparency is demanded.

The adhesive composition which may be used for the fixation purpose in an optical passage should have the following properties:

(1) Being improved in matching of refractive index with those of the optical members to be united;
(2) To resist the heat applied at the soldering step for assembling the optical members;
(3) Change in refractive index with the lapse of time thereof being as small as possible; and
(4) Having satisfactory workability, i.e. being easily handled in the operational steps.

In order to shorten the time required for assembling the optical members, it is within the common technical knowledge of a person having ordinary skill in the art that a solder is used in place of the adhesive. In the practice of such alternation, the ferrule fixing the glass fiber with adhesive is fixed to a ferrule holder by soldering. One of commercially available adhesives was empirically used to join the end face of glass fiber system to the glass with anti-reflection layer. Then, the joined glass fiber system was subjected to soldering for fixing the ferrule to the ferrule holder. Whereupon, the adhesive at the joined interface became foamed due to the heat at the soldering step. By other experiments, it has been found that the refractive indices and/or other properties of the cured compositions are changed after the optical member bound by certain commercially available adhesives are assembled.

OBJECTS AND SUMMARY OF THE INVENTION

Accordingly, the principal object of the present invention is to provide an improved adhesive composition for use in combination with an optical member, which has a good matching property in respect of refractive index to well adapted to be matched with the refractive indices of optical members applied therewith, and which is improved in resistance to heat to be sustainable to a heat generated at the soldering step, and durable for a long time with little change in refractive index and other properties to be used reliably.

After eager pursuits for preparing such an improved adhesive composition improved in index matching property and lowered in optical loss with high adhesive strength, excellent heat-resisting property, high elasticity, improved defoaming property and improved workability, we have accomplished the present invention by centering our investigations on adhesive compositions containing any one or more of fluorine-containing epoxy resins, fluorinated reactive diluents and fluorine-containing hardeners. During the course of our development works, fluorine atoms are introduced all of the tested epoxy resins, reactive diluents and hardeners or curing agents to learn the best combination thereof.

As the result of our investigation, the present invention provides an adhesive composition particularly improved in defoaming property and workability, which may be cured at a relatively low temperature ranging from the room temperature to 60° C. The adhesive composition provided in accordance with the invention comprises a fluorine-containing epoxy resin, a hardener derived from a long-chain polyamide and a fluorinated diluent.

BRIEF DESCRIPTION OF THE DRAWINGS

Full understanding of the invention will be had from the following detailed description of the invention and examples thereof with reference to the appended drawings, in which:

FIG. 2 is a graphic representation showing the refractive indices of the cured compositions in terms of the contents of fluorine atom of the cured fluorine-containing epoxy resin compositions;

FIG. 3 is a graphic representation showing the refractive indices and the light transmission losses of the adhesive compositions in terms of the contents of addition reactive diluents;

FIG. 16 is a diagrammatical view showing a generally cylindrical lens having one end face coated with a protection layer made of the adhesive composition;

FIG. 17 is a graphic representation showing the change in reflectivity at the interface between air and the end face of the coated protection layer in terms of the thickness of the adhesive composition;

FIG. 19 is a graphical representation showing the change in reflectivity at the joined interface of the combination shown in FIG. 18(a) in terms of the thickness of the adhesive composition.

DESCRIPTION OF PREFERRED EMBODIMENTS

Figure 1:
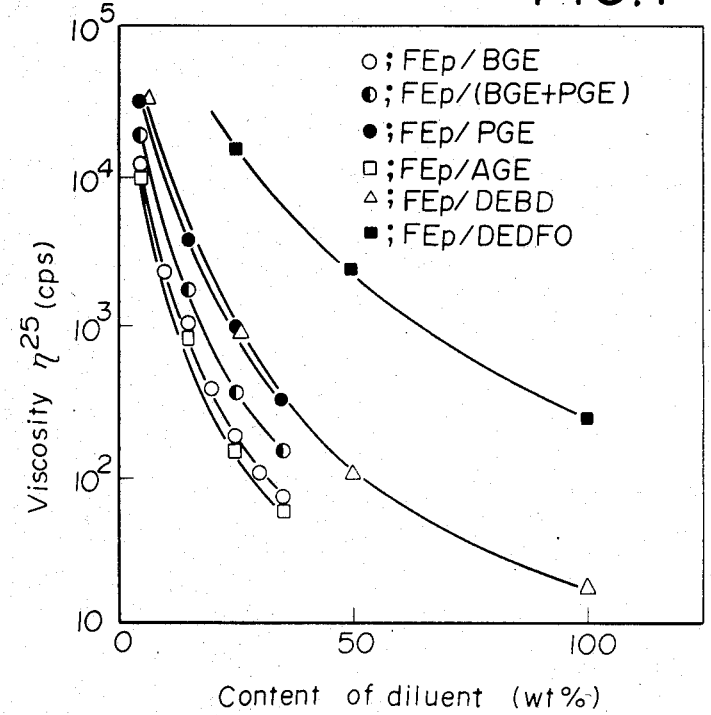
FIG. 1 is a graphic representation showing the viscosity of the epoxy resins in terms of the contents of the added reactive diluents.

The refractive index of a cured composition or compound formed from an epoxide base adhesive composition composed of an epoxy resin, a reactive diluent and a hardener can be lowered by the inclusion of fluorine atoms introduced in at least one of the components. The refractive index of the entire cured mass may be controlled by adding the aforementioned adhesive composition with additional epoxy resin, reactive diluent and/or hardener which includes no fluorine atom to vary the content of fluorine in the combined mass.

A representative fluorine-containing epoxy resins which may be used in the invention includes (1) glycidyl ether of bisphenol-AF synthesized from epichlorohydrin and bisphenol-AF

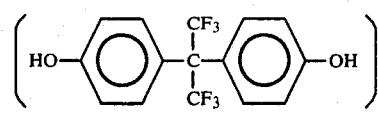

which has been prepared from hexafluoroacetone ($F_3C-CO-CF_3$) and phenol (carbolic acid). A further example of such resins is (2) a diglycidyl ether synthesized from epichlorohydrin and a mixture of the bisphenol-AF with bisphenol-A

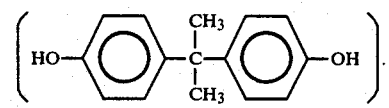

A still further example of usable fluorine-containing epoxy resin is (3) a diglycidyl ether synthesized from epichlorohydrin and 2,2,3,3,4,4,5,5,6,6,7,7-dodecafluorooctane-1,8-diol.

The aforementioned preferred fluorine-containing epoxy resins are represented by the following formulae of:

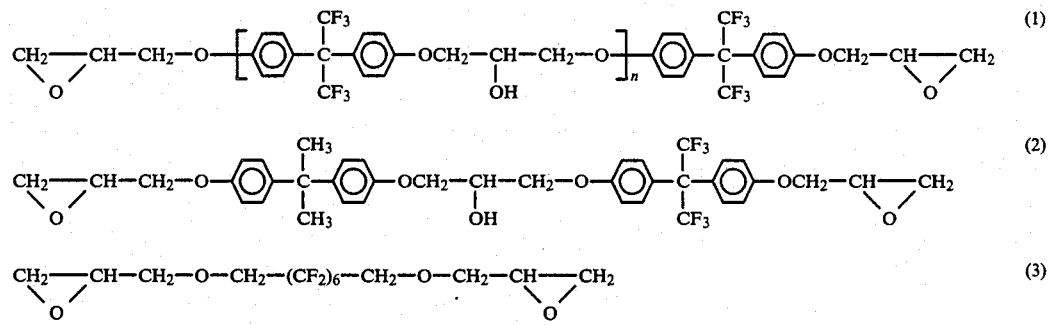

Examples of the epoxy resins containing no fluorine atoms are diglycidyl ehter of bisphenol-A, diglycidyl ether of 2,2'-bis(4-hydroxy-3,5-dibromophenyl)propane, diglycidyl ether of butandiol, diglycidyl ether of 4,4'-dihydroxydiphenyl and diglycidyl ether of resorcin.

The most preferred fluorine-containing hardener are 4-perflouro-1,3-dimethyl-2-(1-methylethyl)-1-butenyloxyphtahlic anhydride (4) and 2,2,3,3,4,4-hexafluoropentanediamine (5), followed by amination to form an amide which is then subjected to reduction. The hardener (5) and the intermediate product (4) are represented by the following formulae of:

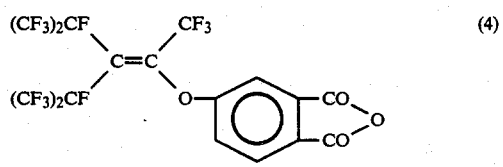

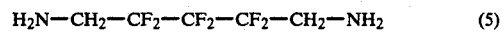

Examples of hardeners or curing agents including no fluorine atom are triethylenetetramine, polyamide base compounds, and acid anhydrides such as Nadic methyl anhydride. It is desirous that the content of such a hardener ranges within 0.8 to 1 gram equivalent of a hardener to one gram equivalent of epoxy resin contained in the used epoxy resin, in order to obtain a cured product having improved adhesive strength, excellent flexibility, improved resistance to heat, improved wettability to the object to be applied with the adhesive, and also to be lowered in optical loss and improved in matching with the optical members.

Examples of the fluorine-containing reactive diluent which may be used in the invention are epoxy resins having low viscosities, such as diglycidyl ether of 2,2,3,3,4,4,5,5,6,6,7,7-dodecafluorooctane-1,8-diol, as set forth hereinabove, and pentafluorophenyl glycidyl ether synthesized from pentafluorophenol and epichlorohydrin and represented by the following formula (6) of:

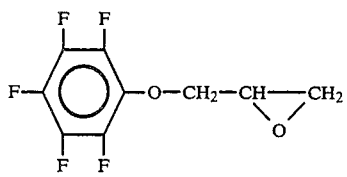
(6)

Examples of reactive diluents containing no fluorine atoms include monoepoxy compounds, such as butyl glycidyl ether, phenyl glycidyl ether, allyl glycidyl ether, styrene oxide, cresyl glycidyl ether, cyclohexene vinylmonoxide; diepoxy comopounds, such as butadienedioxide, diglycidyl ether of resorcinol and butanediol diglycidyl ether; and triepoxy reactive diluents, such as 2,6-diglycidylphenyl glycidyl ether.

The composition of the invention may be added with an accelerator, such as benzyldimethylamine (hereinafter referred to as BDMA) or 2-ethyl-4-methyl imidazole, as desired. It is preferable that 0.5 to 2 parts by weight per hundred resin (phr) of such an accelerator is added to 100 parts by weight of the epoxy resin. Various other additives, such as modifiers, spreaders or softeners may be added to the adhesive composition of the invention.

The advantageous effect realized by the addition of the reactive diluent in the composition of the invention will now be described by referring to the viscosity, surface tension, and content of fluorine of the resultant epoxy resin composition.

FIG. 1 shows the viscosities of epoxy resin compositions, at 25° C., prepared from a florine-containing epoxy resin (hereinafter referred to as FEp) which is a diglycidyl ether of bisphenol-AF having an epoxy equivalent of 290 and represented by the general formula (1) wherein n is 0.3 and addition reactive diluents including diglycidyl ether of butane-diol (hereinafter referred to simply as DEBD, and the change in viscosity of the mixture being represented by the curve plotting the marks Δ in the Figure), diglycidyl ether of 2,2,3,3,4,4,5,5,6,6,7,7-dodecafluorooctane 1.8-diol (hereinafter represented simply by DEDFO, the change in viscosity thereof being represented by the curve plotting the marks ■ ), butyl glycidyl ether (hereinafter referred to simply as BGE, and the change in viscosity thereof being represented by the curve plotting the marks ○), phenyl glycidyl ether (hereinafter referred to simply as PGE, and the change in viscosity thereof being represented by the curve plotting the marks ● allyl glycidyl ether (hereinafter referred to simply as AGE, and the change in viscosity thereof being represented by the curve plotting the marks □) and a mixture of butyl glycidyl ether and phenyl glycidyl ether, the change in viscosity thereof being represented by the curve plotting the marks ◐.

A so-called B-type viscometer produced and sold by Tokyo Precision Instrument Co., Ltd. was used for the determination of the viscosities. The viscosity of the FEp composition is lowered by the addition of any one of these reactive diluents. The diglycidyl ether of bisphenol-AF (FEp) is of paste form at 25° C. and it is estimated that the viscosity thereof at that temperature is more than 200,000 cps (centi poises). It is, therefore, difficult to mix the resin with a hardener uniformly. In order to obtain a uniform mixture, the resin must be heated to lower the viscosity thereof before it is mixed with a hardener. Since the reaction between the FEp and the hardener is accelerated to shorten the pot life for allowing easy handling of the mixed composition so that the workability of the resin composition is considerably deteriorated. In contrast thereto, the FEp compositions added with the reactive diluents have viscosities of not higher than 50,000 cps as seen from FIG. 1 so that they can be readily mixed with hardeners at room temperature. Low viscosities of the compositions also afford the merit that they can be conveniently filled in very small structural members. The quantity of the added diluents may be freely varied to control the viscosity of the resultant compositions in compliance with the requirement to improve the workability or operation efficiency and to provide various compositions which may be applied for wide spread uses. The viscosities and surface tensions measured at 25° C. versus content of fluorine atoms (wt %) are shown in Table 1, together with the comparison data of Epikote 828 (Trade Name, produced by Yuka schell Epoxy Co., Ltd.)

TABLE 1

| Run. No. | Epoxy Resin wt % | Reactive Diluent wt % | Viscosity 25° C. cps | Surface tension 25° dyn/cm | Content of F-atoms wt % |
|---|---|---|---|---|---|
| 1 | FEp 75 | DEBD 25 | 810 | 32 | 20 |
| 2 | FEp 75 | DEDFO 25 | 14,300 | 29 | 32 |
| 3 | FEp 50 | DEDFO 50 | 2,700 | 28 | 37 |
| 4 | DEDFO 100 | — | 230 | 25 | 48 |
| 5 | Epikote 100 828 | — | 13,000 | 49 | 0 |

DEBD: Diglycidyl ether of butanediol
DEDFO: diglycidyl ether of 2,2,3,3,4,4,5,5,6,6,7,7-dodecofluoro Octane-1'8-diol It is known that the wettability of a certain adhesive composition to an object to be applied with the adhesive composition depends upon the surface tension of the composition, and the wettability is promoted as the surface tension of the composition is decreased. The compositions of the invention have surface tensions which are remarkedly smaller than that of Epikote 828 to show that they have superior wettabilities to wet the overall surface of an object to be applied therewith. By using different kinds of reactive diluents or by varying the content of the reactive diluent added to the composition, the viscosity and/or the content of fluorine atoms may be changed while keeping the surface tension at a small value.

Now, the description will be turned to the explanation of the operation for joining optical members using the adhesive composition of the invention. The adhesive composition has a fluidity during the operation time, and solidified after being cured to loose its initial fluidity. A fluorine-containing epoxy resin, a reactive diluent and a hardener or during agent are mixed together to prepare an adhesive mixture, according to the present invention, which has an aimed refractive index matching with the optical members and which is improved in workability to form optical members durable for a long time under reliable condition. The mixture is then defoamed, coated on one side of an optical member or inserted in-between the optical members followed by curing.

The adhesive composition of the present invention mainly composed of a fluorine-containing epoxy resin may be used in a laser diode (LD) module, optical members of an optical coupler and an optical instrument to manufacture an optical member, whereby an optical member excellent in matching in refractive indices can be produced.

The reflectivity at the matching interface is calculated from the following equation. Supposing now that a membrane or layer having a thickness of $d_1$ and made of a material having a refractive index of $n_1$ is present in-between two media having refractive indices of $n_0$ and $n_2$ and that a light is incident perpendicularly from the medium having the refractive index of $n_0$, the intensity of the reflected light to that of the incident light, namely the reflectivity R is calculated from the following equation.

$$R = \frac{\frac{(n_2 - n_1)^2}{(n_2 + n_1)^2} + \frac{(n_1 + n_0)^2}{(n_1 + n_0)^2} + 2\frac{(n_2 - n_1)(n_1 - n_0)}{(n_2 + n_1)(n_1 + n_0)} \cos\{2\pi(2n_1d_1)/\lambda\}}{1 + 2\frac{(n_2 - n_1)(n_1 - n_0)}{(n_2 + n_1)(n_1 + n_0)} \cos\{2\pi(2n_1d_1)/\lambda\}}$$

In the equation set forth above, $\lambda$ is the wavelength of the wave utilized in measurement, and matching of the refractive indices is the equivalent task for decreasing the value R.

The adhesive compositions according to the present invention also have favorable characteristics that they are excellent in transparency, that they have sufficient resistance to heat well sustaining heating at the soldering operation, and that the changes with the lapse of time thereof are little.

EXAMPLES OF THE INVENTION

The present invention will be described more specifically by referring to examples thereof.

Example 1

Diglycidyl ether of bisphenol-AF (FEp), diglycidyl ether of 2,2,3,3,4,4,5,5,6,6,7,7-dodecafluorooctane-1,8-diol (DEDFO) and Epikote 828 were used as the epoxy resin components. The used hardener composition was composed of nadic methyl anhydride (hereinafter referred to as NMA), 4-[perfluoro-1,3-dimethyl-2-(1-methylethyl)-1-butenyl]-oxyphthalic anhydride (represented by the formula (4) as set forth hereinbefore; and hereinafter referred to as PFPA), and Versamid V-140 (Trade Name; produced by Henkel Hakusui Co. Ltd.) which was a polyamide resin base compound. Used as the reactive diluents were DEDFO and diglycidyl ether of butanediol (hereinafter referred to as DEBD). The aforementioned components were mixed together intimately to be cured. The refractive index of the cured product was measured through an Abbe's refractometer while utilizing the D-line of sodium (589.3 nm).

The content of fluorine in the cured product is plotted along the abscissa of the graph in FIG. 2, whereas the refractive index is plotted along the ordinate of the graph. The curve plotting the marks ○ shows the refractive indices versus the content of fluorine in the cured products prepared by changing the mixing ratio between FEp and Epikote 828 added with a hardener in the ratio of with 50 parts by weight of Versamide V-140 to 100 parts by weight of the epoxy resin components, followed by curing at 90° C. for 4 hours. The curve plotting the marks Δ shows the refractive index versus the content of fluorine in the cured products prepared by changing the mixing ratio between NMA and PFPA used as a hardener for the FEp, the mixture being added in a ratio of 0.9 gram equivalent of the hardener to 1 equivalent of the epoxide group in the FEp resin, and subjected to curing at 150° C. for 15 hours. The curve plotting the marks □ shows the refractive index versus the content of fluorine in the cured products prepared by changing the mixing ratio between NMA and PFPA, the mixture of NMA and PFPA being added in a ratio of 0.9 gram equivalent to 1 gram epoxide equivalent of DEDFO used as the epoxy resin, followed by curing at 150° C. for 15 hours. The curve plotting the marks ▲ shows the refractive indices versus the content of fluorine in the cured products prepared by changing the mixing ratio of FEp to DEDFO, the mixture being used as the epoxy resin component and added with Versamid V-140 as the hardener in a ratio 50 parts by weight of the latter is mixed with 100 parts by weight of the former, followed by curing at 60° C. for 15 hours. The plot ▣ shows the refractive index and the content of fluorine atom of a cured product prepared by using a mixed epoxy resin composed of FEp and butyl glycidyl ether (BGE) at a weight ratio of 85:15 and adding with Versamid V-140 so that 50 parts by weight of Versamid V-140 is added to 100 parts by weight of the mixed epoxy resin. The curve plotting the marks ◉ shows the refractive indices and the content of fluorine in cured products prepared while changing the mixing ratio between NMA and PFPA used as the hardener to cure Epikote 828, the ratio of the mixed hardener to the epoxy resin being such that 0.9 gram equivalent of hardener is added to 1 gram equivalent of the resin, and the curing being effected at 150° C. for 15 hours.

The refractive index of a certain cured product depends on the content of fluorine therein. As seen from FIG. 2, a substantially linear interrelation between the refractive index and the content of fluorine is found as the content of fluorine is increased. Accordingly, the content of fluorine in the cured composition is varied by changing the composition of uncured composition, whereby the refractive index of the cured product can be freely controlled in the range of from 1.415 to 1.570. As a result, an adhesive composition having a refractive index completely matching with that of the quartz glass or the BK7 glass can be prepared. Furthermore, in formation of an optical integrated circuit, an adhesive having a refractive index which is lower than those of optical glass can be used as a casting material for sealing the optical circuit after the formation thereof. Such an adhesive may also be used for forming a clad coating over optical fibers. Since the adhesive compositions according to the invention provide cured product having refractive indices which are considerably lower than those of the quartz and BK7 glasses, they may be applied as clad coating materials for optical circuits or used as casting materials having low refractive indices. It should be understood from FIG. 2 that the content of fluorine in the cured product be adjusted to 12% to prepare a cured product having a refractive index of 1.54. Similarly, it is understood that a cured product having a refractive index of about 1.42 may be prepared by adjusting the content of fluorine in the cured product to 50%.

Example 2

A mixture of FEp (1) and DEDFO and a mixture of FEp (1) and diglycidyl ether of butane-diol (DEBD) were used as the mixed epoxy resin components. 50 parts by weight of Versamid V-140, a polyamide base hardener as described hereinbefore, was added to 100

When PFPA was used as the hardener, benzyl dimethyl amine was used as an accelerator.

Adhesive compositions were prepared by mixing the aforementioned components, followed by defoaming. The adhesive compositions were cured at 60° C. for 15 hours in Run Nos. 1 to 4, and cured at 150° C. for 5 hours in Run No. 5.

The refractive indices and the optical transmission losses were measured and determined using a refractometer and a spectrometer. The pot life of each composition was studied, and a time required for vacuum defoaming the mixture prepared at room temperature was also studied to know the defoaming time. Further studied was an adaptability for filling (hereinafter referred to as filling property). The results are shown in Table 2.

TABLE 2

| Run No. | Epoxy Resin (phr) | Reactive Diluent (phr) | hardener (phr) | Refractive Index ($n_D^{23}$) | Pot Life (hr) | Defoaming Time (min) | Filling Time Inner Glass | Filling Time Outer Glass | Tg (°C.) | Young' Modulus (kgf/cm$^2$) |
|---|---|---|---|---|---|---|---|---|---|---|
| 1 | FEp(75) | DEBD(25) | V-140(50) | 1.528 | 2.5 | 7 | 0 | 0 | 80 | $2.3 \times 10^4$ |
| 2 | FEp(75) | DEDFO(25) | V-140(50) | 1.515 | 2.5 | 8 | 0 | 0 | 95 | $2.0 \times 10^4$ |
| 3 | FEp(50) | DEDFO(50) | V-140(50) | 1.500 | 2 | 7 | 0 | 0 | 85 | $1.7 \times 10^4$ |
| 4. | DEDFO(100) | — | V-140(50) | 1.460 | 2 | 5 | 0 | 0 | 41 | $5.2 \times 10^4$ |
| 5. | DEDFO(100) | — | PFPA(225) + BDMA(1) | 1.415 | — | — | — | — | — | — |
| 6. | Epikote 828 (100) | — | V-140(50) | 1.570 | 3 | 30 | x | x | 90 | $2.9 \times 10^4$ |
| 7. | Pernox MG 155A(100) | — | Pernox HY 155B(50) | 1.543 | 2 | 30 | | | 30 | $1.0 \times 10^4$ |
| 8. | Lens Bond M62, 100 | | Lens Bond M62(2) | — | — | — | — | — | 90 | $2.9 \times 10^4$ |

Note:
V-140 means Versamid V-140, a curing agent produced by Henkel Hakusui Co., Ltd.
In this and subsequent Tables, "phr" stands for "part by weight per hundred resin".

parts by weight of each of the mixed epoxy resin components, followed by curing at 60° C. for 15 hours. FIG. 3 shows the change in refractive indices ($n_D^{23}$) and the optical losses at the wavelength of 1.3 μm in terms of the added contents of DEDFO and DEBD (glycidyl ether of butane-diol). In the Figure, the plots ▽ show the refractive index and the optical transmission loss of the cured product prepared by using FEp as the epoxy resin component. The plots △ show the properties of the cured product prepared by using the combination of FEp (1) and diglycidyl ether of butane-diol (DEBD), whereas the plots ▨ show the properties of the cured product prepared by using the combination of FEp (1) and DEDFO. A sample having a thickness of 1 mm was used for the determination of optical loss.

The optical losses are not affected by the increase or decrease of the reactive diluents, and maintained at an extremely low level of about 1%.

As seen, the refractive indices $n_D^{23}$ are lowered, as the quantities of the added reactive diluents increase. Therefore, the refractive index may be changed slightly by varying the quantity of the added reactive diluent to improve the adaptability for matching the refractive index during the step of joining the optical members with each other.

Example 3

FEp (1) and DEDFO (3) were used as the epoxy resin components, and diglycidyl ether of butane-diol (DEBD) and DEDFO (3) were used as the reactive diluents. Meantime, DEDFO (3) may be used either as an epoxy resin component or as a reactive diluent. As the hardeners, used were Versamid V-140, PFPA (4).

For the comparison purpose, Epikote 828 and Versamid V-140 were mixed in a ratio of 100:50 by weight, in Run No. 6, and then cured at 60° C. for 7 hours. In Run No. 7, Pernox MG 155 (Trade Name, produced by Nippon Pernox Co.) was cured at room temperature for 8 hours and then at 60° C. for additional 8 hours. In Run No. 8, Rens Bond M62 (Trade name; produced by Sommers Co.,) is cured at room temperature for 4.6 hours.

Figure 4:
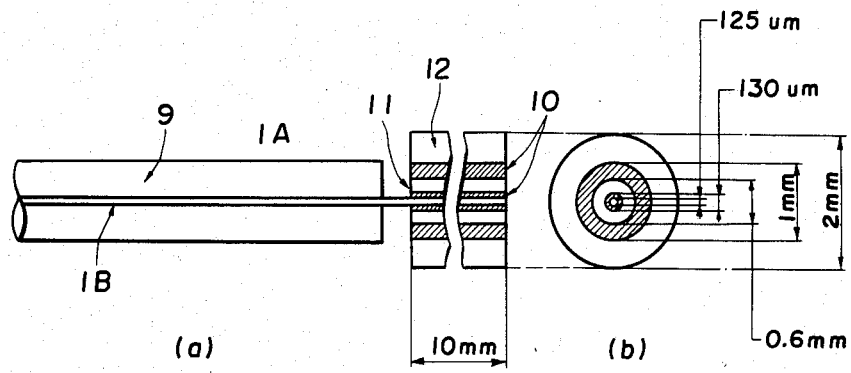
FIG. 4 is a schematic view showing the double-wall glass tube and the glass fiber system used for testing the filling properties of the adhesive compositions.

The filling properties of the adhesive compositions were studied by using the double-wall glass tube shown in FIGS. 4(a) and 4(b). FIG. 4(a) shows the section taken along the longitudinal direction of the tube, and FIG. 4(b) shows the cross section. In the figure, reference numeral 10 designates an adhesive composition, numeral 11 designates and inner glass tube, and reference numeral 12 designates an outer glass tube. A nylon coated optical fiber is denoted by 1A, a bare fiber is denoted by 1B and a nylon coating is denoted by 9. As shown in FIG. 4(b), a double-wall glass tube (11, 12) having a length of 10 mm was prepared, and the bare fiber 1B is inserted throught the center of the tube, while holding the gap between the bare fiber 1B and the inner tube 11 at about 2.5 μm. The gas between the outer glass tube or pipe 12 and the inner glass tube or pipe 11 is about 200 μm. The gap between the bare fiber 1B and the inner tube and the gap between the inner and outer tubes are filled with the adhesive composition 10. The filling was carried out by dropping several drops of the composition in the center of the outer glass tube 12 and dropping one drop of the composition in the center of the inner glass tube 11, followed by insertion of the bare fiber 1B along the center of the inner tube 11.

The filling property of each composition was appraised separately with respect to that in the inner tube and that between the inner and outer tubes. Complete filling is indicated by the mark ○ and filling with foams is indicated by the mark Δ, whereas the case in which filling could not be made is indicated by the mark X. The refractive indices of the compositions of Run Nos. 1 to 5 ranged within 1.415 to 1.528, which were smaller than those in Run Nos. 6 and 7. The compositions of the invention are, thus, excellent in matching when used as the adhesives for joining optical members made of quartz glass fibers ($n_D^{23}=1.46$) or BK7 ($n_D^{23}=1.5164$) or KZF$_2$ ($n_D^{23}=1.5294$) glasses.

Each of the compositions of Run Nos. 1 to 4 has a long pot life ranging within 2 to 2.5 hours, and may be easily defoamed within a defoaming time of 5 to 8 minutes under a condition of 25° C. at 3 mmHg, to improve the workability or operation efficiency with favorable results that scattering or reflection of the transmitted light by the foams can be eliminated.

The inner and outer glass tubes are filled completely with the adhesive compositions in Run Nos. 1 to 4. The filling properties of the compositions in these experimental runs are superior over those in the comparison runs 6 and 7.

Figure 5:
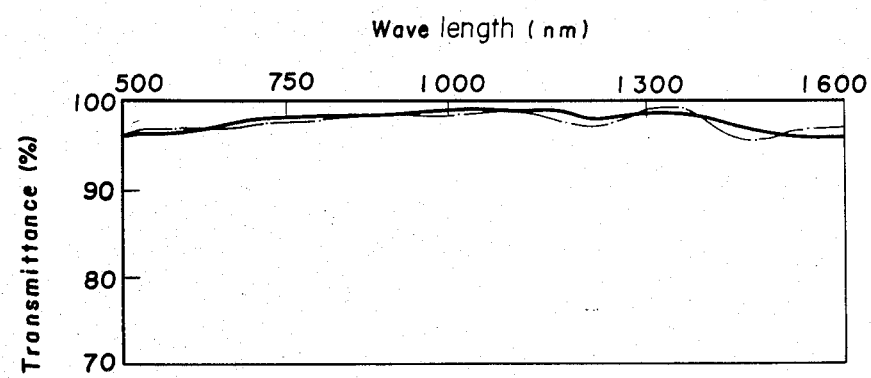
FIG. 5 is a graphic representation showing the change in transmission factors of adhesive compositions in terms of the wavelength.
Figure 6:
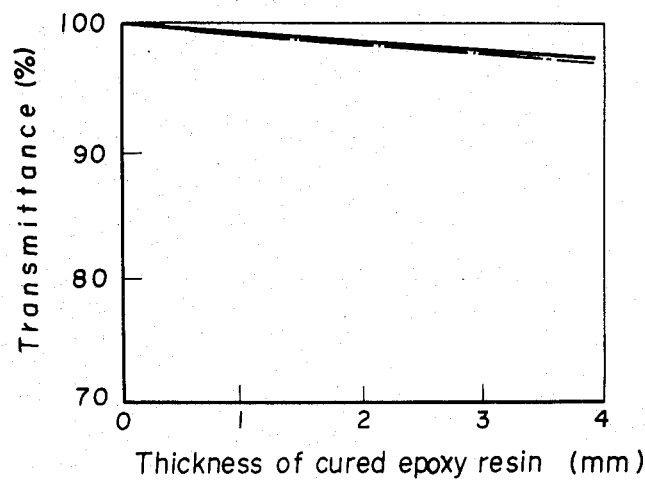
FIG. 6 is a graphic representation showing the change in transmission factor in terms of the thickness of an adhesive composition.

The wavelength dependency of the transparency of each of the cured adhesive compositions of Run Nos. 1 and 6 is shown in FIG. 5, and the thickness dependency of the transparencies of the cured compositions are shown in FIG. 6. Run No. 1 is shown by the real line and Run No. 6 is shown by the dot-and-dash line in FIG. 5, the test piece used in each experimental run having a thickness of 1 mm. The results of tests conducted on the compositions of Run Nos. 1 to 6 show that the transmission loss of a light having a wavelength of 500 nm to 1600 nm caused by each composition is less more than 5%. As seen from FIG. 6, the optical transmission losses of the compositions of Run Nos. 1 and 5 are less more than 5%, even when the thickness of the cured compositions are increases to 3 mm, when a light having a wavelength of 1300 nm is used. Substantially the same results were obtained as to the compositions of Run Nos. 2 to 5 to show similar light transparencies.

The adhesive strength was appraised in accordance with the prescriptions set forth in JIS (Japanese Industrial Standard) K-6848 and JIS K-6850 by measuring the tensile shear adhesive strengths of the cure compositions using a load elongation tester produced and sold by Instron Engineering Corp.

Further studies were made on the glass transition temperature (Tg) which is a parameter having a connection with the resistance to heat of each composition and on the Young's modulus which is a parameter having a connection with the flexibility. The test was conducted using a viscoelastometer (produced by Toyo Boldwin Co.; Vibron DDV EA Type). The prior art adhesive compositions for optical uses have the tendency that the heat-resisting property becomes inferior with the reduction of Tg approximately to the room temperature, exemplarily shown by Run No. 7, when the composition is adjusted to have a Young's modulus of in the order of $1.0 \times 10^4$ kgf/cm$^2$. However, referring to Run No. 4 of the invention, the composition has a Young's modulus of $5.2 \times 10^3$ kgf/cm$^2$ and has a Tg value of 41° C. Thus, the adhesive compositions according to the present invention are excellent both in flexibility and resistance to heat.

The adhesive compositions of the invention have high tensile shear adhesive strengths when used to adhere quartz glass to quartz glass, and have adhesive strengths enough high for properly joining optical members. Now comparing the results of Run Nos. 1 to 3 with the result of Run No. 7 regarding the tensile shear adhesive strengths for the Copper to copper adhesion, the strengths obtained in Run Nos. 1 to 3 are higher than that in Run No. 7. The Young's moduli in Run Nos. 1 to 4 are smaller than that in Run No. 6. The results of Run Nos. 1 to 5 show that the reduction in Tg are not seriously affected by the reduction in Young's modulus. As should be appreciated from the foregoing, the adhesive compositions of the invention are superior over the commercially available adhesives in all of the adhesive strength, resistance to heat and flexibility.

Example 4

Figure 7:
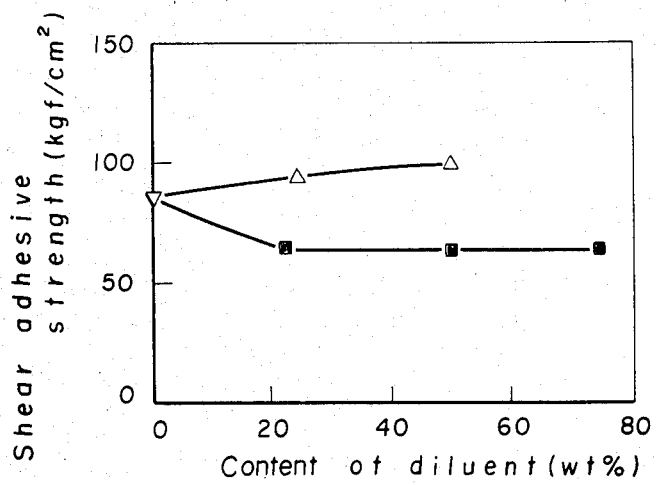
FIG. 7 is a graphic representation showing the change in shearing adhesive strength in terms of the contents of the added reactive diluent.

Various compositiqns were prepared from the combination of FEp (1) and diglycidyl ether of butane-diol (DEBD) and the combination of FEp (1) and DEDFO (3) while varying the added amounts of DEBD and DEDFO acting as reactive diluents. The compositions were used for adhering copper to copper, and the tensile shear strengths of the adhered Copper to copper were studied. FIG. 7 shows the interrelation between the added contents (wt %) of the reactive diluents and the tensile shear adhesive strengths of the adhesion. The used adhesives were of the same as those described hereinbefore with reference to FIG. 3. 50 parts by weight of Versamid V-140 were added to 100 parts by weight of epoxy resin components as the curing agent, and the mixtures were cured at 60° C. for 15 hours. The test for the determination of tensile shear strength was conducted at 23° C. and at a relative humidity of 65%. As seen from the results, the adhesive strengths of the cured compositions are high when DEBD and/or DEDFO (3) are added as the reactive diluents. The results are not changed even if a large amount of either one of the reactive diluents is added.

Example 5

Figure 8:
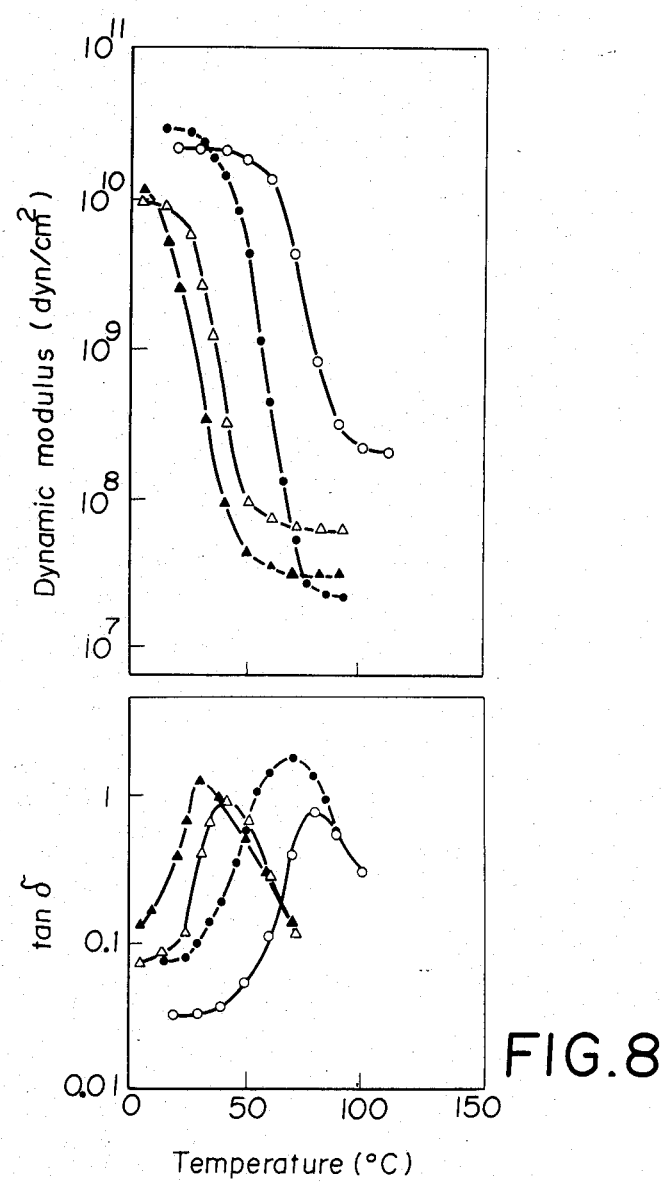
FIG. 8 is a graphic representation showing the temperature dependencies of tan and the dynamic modulus of cured adhesive composition.

FIG. 8 shows the results of tests for determining the dynamic modulus of the compositions of Run Nos. 1 to 4 of the invention, together with comparison test results of the composition of Run No. 6 and a commercially available adhesive, Run No. 8 (Lens Bond M62, Trade Name; produced by Summers Corp.). The abscissa of FIG. 8 represents temperature change, and the dynamic modulus and tan δ are shown by the ordinate. In the Figure, the temperature corresponding to the peak value of tan δ is the glass transition temperature (Tg) of each composition. The graph plotting the marks ○ shows Run no. 1 the graph plotting the marks Δ shows Run No. 4, the graph plotting the marks ▲ shows Run No. 7, and the graph plotting the marks ● shows the result obtained by the use of Run No. 8.

It should be understood, by comparing the result of Run No. 1 to that obtained by the use of the commercially available adhesive of Run No. 6, that the adhesive composition of the invention has a low dynamic modulus around the room temperature and has a high Tg value affecting the resistance to heat. Accordingly, it should be appreciated that a cured product excellent in resistance to heat and also excellent in flexibility can be obtained by the present invention. The composition of Run No. 4 having a dynamic modulus which is further lowered than that in Run No. 1 to improve the flexibility, is superior over the commercially available adhesive shown by Run No. 8 in flexibility and yet has a high Tg value indicating that it has improved heat-resisting property and improved flexibility.

Example 6

50 parts by weight of Versamid V-140 was added to 100 parts by weight of a mixed epoxy resin composed of FEp (n=0, Epoxy Equivalent=225) and Epikote 828 having an epoxy equivalent of 189, and then the mixture was heated, further mixed and defoamed to prepare a composition for use as an adhesive for optical applications. The surface tensions at 70° C., refractive indices of the compositions at 23° C. and glass transition temperature are shown in Table 3. The adhesive strength of each composition when used for the adhesion of quartz to quartz has been estimated more than 45 kgf/cm², in view of the fact that the joined test pieces were broken at the portions of the objects joined together by each one of the adhesive compositions of the invention.

TABLE 3

| Run no. | FEp[1] phr | Epikot 828 phr | Surface tension dyn/cm² | Tg °C. | $N_D^{23}$ |
|---|---|---|---|---|---|
| 1 | 100 | 0 | 34.9 | 115 | 1,528 |
| 2 | 40 | 60 | 38.0 | — | 1,554 |
| 3 | 6 | 94 | 40.0 | 97 | 1,575 |
| 4 | 0 | 100 | 41.7 | 90 | 1.577 |

The compositions were cured at 90° C. for 4 hours. The studies on the wavelength dependency of the transmission coefficient of the adhesive composition revealed that the optical transmission loss within the wavelength range of from 600 nm to 1600 nm was less more than 5%. The transmission loss of a light having a wavelength of 1300 nm transmitted through the cured product, according to the invention, having a thickness of 3 mm was less more than 5%. When n of FEp is more than 7, the viscosity of uncured composition is too high to mix or defoam. Therefore, it is determined that n of FEp should be 0 to 7.

Example 7

A composition was prepared by adding 15 wt % of a mixed reactive diluent composed of butyl glycidyl ether (BGE) and phenyl glycidyl ether (PGE) in a mixing ratio of BGE:PEG=2:1 to 85 wt % of FEp (n=0.3; Epoxy Equivalent: 290). Used curing agents were Versamid V-140 and Versamid V-150 (both being Trade Name, and produced by Henkel Hakusui Co.). The prepared adhesive compositions as set forth in the following Table 4 were cured at 60° C. for 15 hours. The compositions of Run Nos. 9 and 10 set forth for the comparison purpose were composed solely of FEp for Run no. 9 and composed solely of Epikote 828 for Run No. 10, as the epoxy resin component, the comparative compositions of Run No. 9 being cured at 60° C. for 15 hours and the comparative compositions of Run No. 10 being cured at 60° C. for 7 hours similarly to the curing of the compositions of the invention. The composition of Run No. 11 was an commercially available epoxy resin base adhesive for optical applications, which was cured at room temperature for 8 hours. Table 4 shows the mixing ratios of respective adhesive composition and the properties of the cured products including the refractive index, pot life, time costed for defoaming, Tg and Young's modulus.

TABLE 4

| Run No. | Epoxy Resin (phr) | Diluent (phr) | Curing Agent (phr) | Refractive Index ($n_D^{23}$) | Pot Life (hr) | Defoaming Time (min) | Tg (°C.) | Young' Modulus (kgf/cm²) |
|---|---|---|---|---|---|---|---|---|
| 1. | FEp(85) | BGE(15) | V-140(50) | 1.527 | 4 | 4 | 89 | 2.5 × 10⁴ |
| 2. | FEp(85) | BGE(15) | V-140(65) | 1.526 | 3.5 | 4 | 85 | 2.4 × 10⁴ |
| 3. | FEp(85) | BGE(15) | V-150(65) | 1.521 | 3.5 | 3 | 82 | 2.3 × 10⁴ |
| 4. | FEp(85) | BGE(15) | V-150(75) | 1.523 | 3 | 4 | 56 | 9.5 × 10⁴ |
| 5. | FEp(85) | BGE(10) PGE(5) | V-140(50) | 1.530 | 4 | 4 | 88 | 2.4 × 10⁴ |
| 6. | FEp(85) | PGE(15) | V-140(50) | 1.533 | 4 | 4 | 87 | 2.4 × 10⁴ |
| 7. | FEp(85) | PGE(15) | V-140(65) | 1.533 | 2.5 | 5 | 83 | 2.3 × 10⁴ |
| 8. | FEp(85) | PEG(15) | V-150(75) | 1.533 | 3 | 5 | 73 | 2.0 × 10⁴ |
| 9. | FEp(100) | — | V-140(50) | 1.530 | 0.2 | — | 90 | 2.0 × 10⁴ |
| 10. | Epikote 828 (100) | — | V-140(50) | 1.570 | 3 | 30 | 90 | 2.9 × 10⁴ |
| 11. | Pernox MG 155A(100) | | Pernox 155B(50) | 1.543 | 2 | 30 | 30 | 1.0 × 10⁴ |

The composition of Run No. 9 set forth in the Table for comparison purpose was semi-solid at room temperature, and hence could not been mixed homogenously and subjected to defoaming at room temperature. The composition was heated to 70° C. to be melted and then defoamed under vacuum for 5 minutes, accordingly. The pot life of that composition was about 12 minutes. The optical transmission losses of all cured compositions were about 1% at a wavelength of 1.3 μm. The adhesive strength of each composition when used for the adhesion of quarz glass to quartz glass has been estimated more than 45 kgf/cm², in view of the fact that the joined test pieces were broken at the portion of the objects joined together by each one of the adhesive compositions of the invention. When the adhesive compositions of FEp-BGE and FEp-PGE systems were used, the tensile shear adhesive strengths of copper-to-copper adhesion ranged from 92 to 118 kgf/cm² (see Run Nos. 1 to 8). The strength was 96 kgf/cm² for Run No. 10, and the strength was 50 kgf/cm² for Run No. 11.

The optical transmission losses of the adhesive compositions, according to the present invention, are small, and hence the optical transmission loss when any one of the compositions of the invention is used for joining optical passages.

The refractive indices of the adhesive compositions according to the invention ranges within 1.523 to 1.533. Accordingly, they are conveniently used for joining optical members made of quartz glass fibers and BK7 glass or KZF₂ glass ($n_D^{23}$=1.5294) to ensure excellent matching.

The pot life of the adhesive compositions of the invention ranges from 3 to 4 hours at 25° C. They can be easily defoamed within a period of about 3 to 5 minutes at 25° C. under 3 mmHg. The workability or operation efficiency can be improved by the use of the adhesive composition of the invention, with additional advantages that the scattering and/or reflection of transmitted or travelling light by the action of foams can be eliminated.

Example 8

Each of the mixtures including FEp (n=0.3; Epoxy Equivalent=290) and allyl glycidyl ether acting as a reactive diluent was added with either one of curing agents selected from Versamid V-140 and V-150, and the resultant mixture was cured at 60° C. for 15 hours.

The compositions of the adhesives and the properties of the cured products are shown in the following Table 5. The measured properties are, for example, the pot life at 25° C. and the time required for defoaming at 25° C. under vacuum of 3 mmHg, the Tg value and the Young's modulus.

transmitted light due to the presence of foams are eliminated. Referring to Run Nos. 5 and 6, the glass transition temperature of those cured compositions are 90° C. and the Young's moduli thereof are within the range of from $2.7 \times 10^4$ to $2.9 \times 10^4$ kgf/cm$^2$. The composition of Run No. 4 has a Young's modulus of $1.5 \times 10^4$ kgf/cm$^2$ and a Tg of 62° C. The compositions of the present invention are excellent in adhesive strength, resistance to heat and flexibility.

Figure 9:
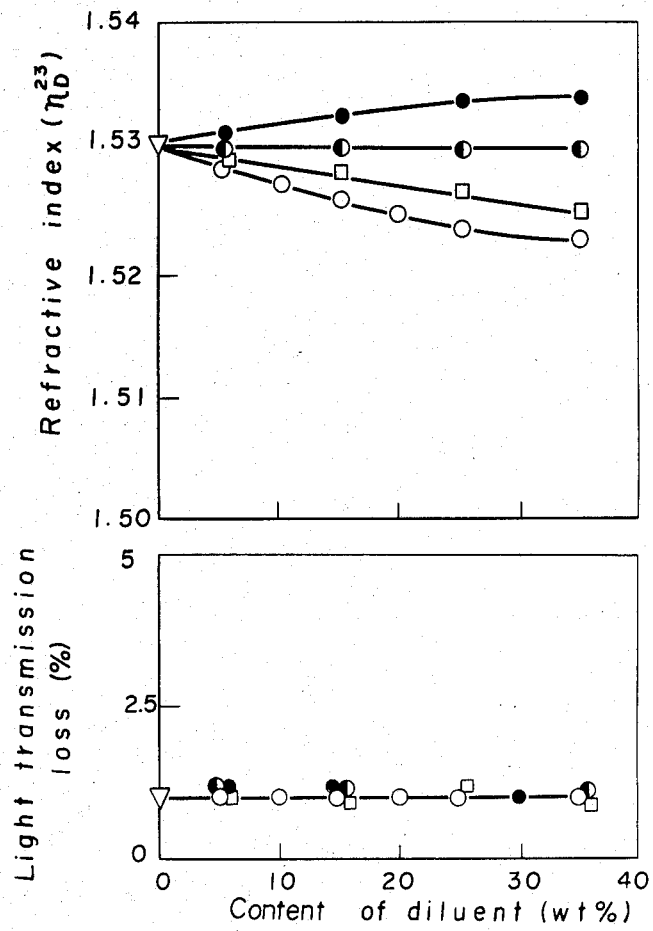
FIG. 9 is a graphic representation of the change in refractive indices and the light transmission losses in terms of the change in content of reactive diluents.
Figure 10:
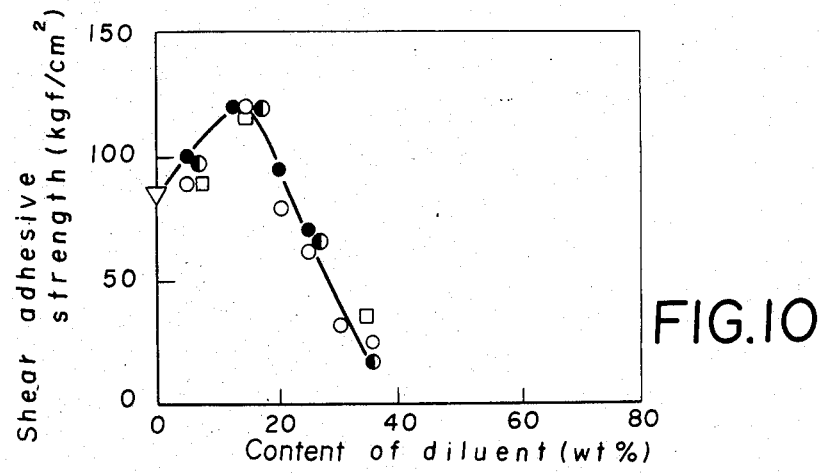
FIG. 10 is a graphic representation of the tensile shearing adhesive strength in terms of the change in contents of the added reactive diluent.

FIG. 9 shows the influences of the added quantities of reactive diluents, such as BGE, PGE and AGE, on the refractive indices and on the optical transmission losses of the resultant products. FIG. 10 shows the invaluences of the added quantities of reactive diluents, such as BGE, PGE and AGE, on the tensile shear adhesive strengths at the interface of the joined copper-to-copper adhesion. Irrespective of either one of BGE, PGE or AGE is used, the tensile shear adhesive strength takes the maximum value when 15 wt % of the reactive diluent is added, the adhesive strength begins to be de-

TABLE 5

| Run No. | Epoxy Resin (phr) | Diluent (phr) | Curing Agent (phr) | Refractive Index ($n_D^{23}$) | Pot Life (hr) | Defoaming Time (min) | Tg (°C.) | Young' Modulus (kgf/cm$^2$) |
|---|---|---|---|---|---|---|---|---|
| 1. | FEp(85) | AGE(15) | V-140(50) | 1.529 | 4 | 5 | 81 | $2.5 \times 10^4$ |
| 2. | FEp(85) | AGE(15) | V-140(65) | 1.528 | 3.5 | 4 | 75 | $2.3 \times 10^4$ |
| 3. | FEp(85) | AGE(15) | V-150(65) | 1.528 | 3.5 | 4 | 74 | $2.1 \times 10^4$ |
| 4. | FEp(85) | AGE(15) | V-150(75) | 1.527 | 3 | 3 | 62 | $1.5 \times 10^4$ |
| 5. | FEp(100) | — | V-140(50) | 1.530 | 0.2 | — | 90 | $2.7 \times 10^4$ |
| 6. | Epikote 828 (100) | — | V-140(50) | 1.570 | 3 | 30 | 90 | $2.9 \times 10^4$ |
| 7. | Lens Bond M62 | — | Lens Bond M62(2) | — | — | — | 70 | $2.9 \times 10^4$ |
| 8. | Pernox MG 115A(100) | — | Pernox HY 155B(50) | 1.543 | 2 | 30 | 30 | $1.0 \times 10^4$ |

The composition of Run No. 5 was semi-solid at the room temperature and could not be uniformalized or homogenously mixed and defoamed at the room temperature. For this reason, the composition was heated to 70° C. to be melted, and then defoamed over a period of 5 minutes. The pot life thereof was about 12 minutes.

The optical transmission loss of a light having a wavelength 1.3 m through a specimen made of each of the compositions of the invention set forth in the preceding Table and having a thickness of 1 mm was about 1%. It has been estimated that the tensile shear adhesive strength between the quarz-to-quarz interface joined by any one of the adhesive compositions of the invention is more than about 45 kgf/cm$^2$, in view of the fact that the object, namely either one of the quartz pieces, has been broken by the pulling force applied during the test. The tensile shear adhesive strenghs at the Copper to copper joined interface were in the range of 90 to 110 kgf/cm$^2$ for Run Nos. 1 to 4, in the range of 88 to 96 kgf/cm$^2$ for Run Nos. 5 and 6, and at a value of 50 kgf/cm$^2$ for Run No. 7.

Run No. 5 was cured at 60° C. for 7 hours, and Run No. 7 was cured at the room temperature for 4.6 hours.

The adhesive composition of Run Nos. 1 to 4, according to the present invention, have refractive indices ranging within 1.527 to 1.529 and are improved in matching of refractive index when used in joining optical members made of quartz glass fibers ($n_D^{23}=1.46$), BK7 glass ($n_D^{23}=1.5164$) and KZF$_2$ glass ($n_D^{23}=1.5294$). They have prolonged pot lives of more than 2 hours, and the defoamation thereof can be effected within a short period of about 3 to 5 minutes to improve the operation efficiency with more advantageous merits that the scattering and/or reflection of the pressed as the content of reactive diluent exceeds 15 wt %. On the contrary, the compositions containing the reactive diluent in a ratio of less than 5% are inferior in workability, in other words they loose easiness in handling due to increase in viscosity. The adequate content of reactive diluent ranges within 5 to 15%.

Example 9

Figure 11:
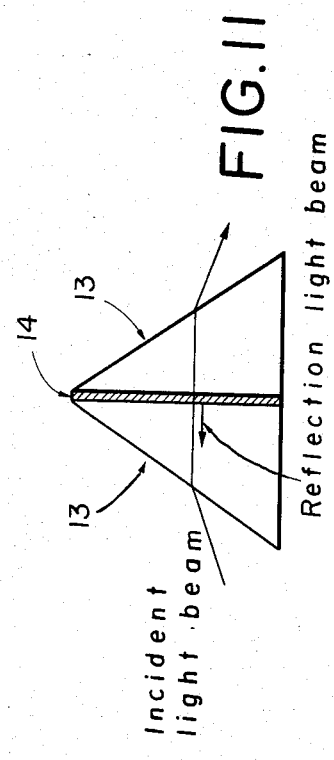
FIG. 11 is a diagrammatical sectional view showing a prism having two parts joined by an adhesive composition.
Figure 12:
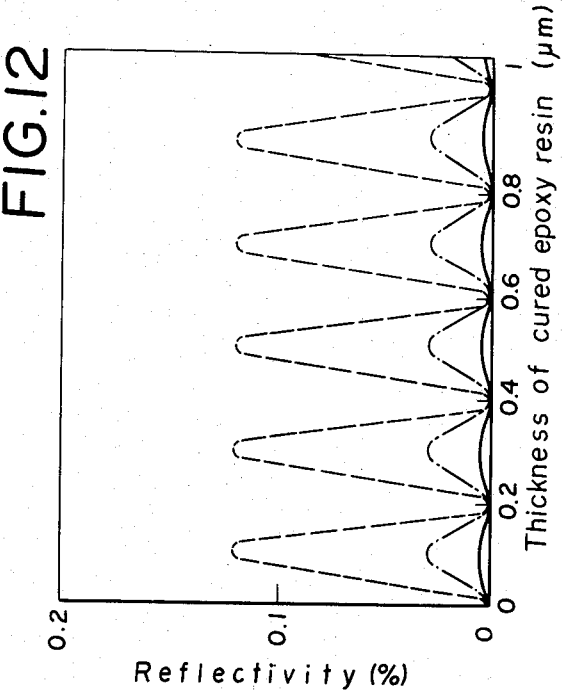
FIG. 12 is a graphic representation showing the change in reflectivity of the adhesive layer shown in FIG. 11 in terms of the thickness of the adhesive composition.

Two prism pieces joined together are shown in FIG. 11. The prism pieces shown in FIG. 11 are made of the BK7 glass. The adhesive composition used is the one shown by Run No. 1 of Example 3, which has been prepared by adding the indicated curing agent to the epoxy resin mixture composed of 75 parts by weight of FEp (1) and 25 parts by weight of DEBD, followed by curing. For the comparison purpose, the adhesive of Run No. 6 of the same Example containing solely Epikote 828 as the epoxy component and the commercially available adhesive, Pernox system, which has been set forth as Run No. 7 in Table 2 were used as the adhesives. One side of each of the two prism pieces 13 were applied with respective adhesive compositions, denoted by 14, and the prism pieces were joined together, followed by heating to cure. the adhesive composition. The abscissa of FIG. 12 indicates the thickness of the adhesive layer, and the ordinate of the same Figure indicates the reflectivity at the interface of the two prism pieces applied with each of the adhesive compositions. The real line curve shows the change in reflectivity of the sample applied with the composition of Run No. 1, which the dotted line being for the composition of Run No. 6 and the dot-and-dash line being for the composition of Run No. 7. It should be clear from the results shown in FIG. 12 that the reflectivity at the joined interface can be adjusted substantially to zero by matching the refractive index of the composition of the invention with the refractive index of the BK-7 glass.

Example 10

Figure 13:
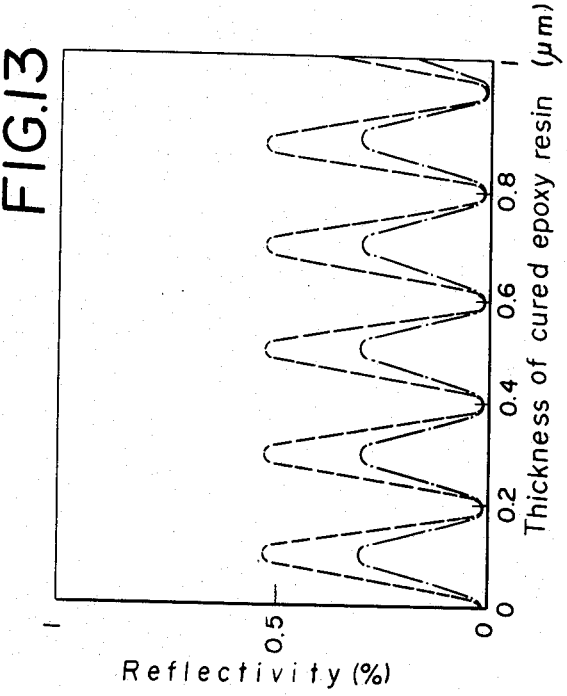
FIG. 13 is a graphic representation showing the change in reflectivity of the adhesive layer used for joining one glass fiber system with another glass fiber system in terms of the thickness of the adhesive composition.

An end face of an optical fiber was allowed to abut against one end of another optical fiber on a molded support base provided with V-shaped groove, and the end faces were joined together using the adhesive composition having a refractive index of 1.528 as set forth in Run No. 1 of Example 3 (see Table 2). Similarly, using the adhesives of Run Nos. 6 and 7 of Example 3, optical fibers were joined and subjected to tests for comparison purpose. The interrelation between the thickness or depth of each of the adhesives relative to the reflectivity at the joined interface is shown in FIG. 13. the D-line (Wavelength=589.3 nm) of sodium was used as the light source for the test. It is possible to reduce the reflectivity at the joined interface to substantially zero percent by completely matching the refractive index of the composition of Run No. 1 with that of the material of the optical glass. The thus joined optical fiber system obtainable by the use of the adhesive composition of the invention is durably and reliably used for a long period without the fear that the oily material has been flown away, otherwise caused by the conventional structure where an oil-form polysiloxane is used. In addition, the adhesive composition of the invention provides another merit that the efficiency in joining operation can be remarkedly improved.

Example 11

Figure 14:
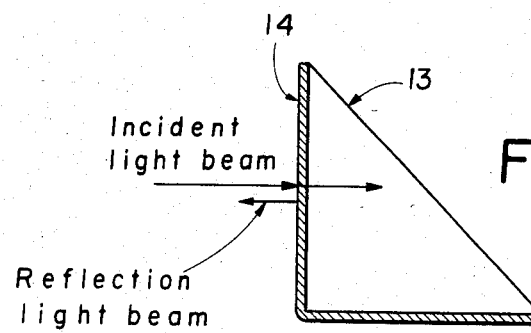
FIG. 14 is a diagrammatical sectional view showing a prism having on face coated with the adhesive composition as the anti-reflective layer.
Figure 15:
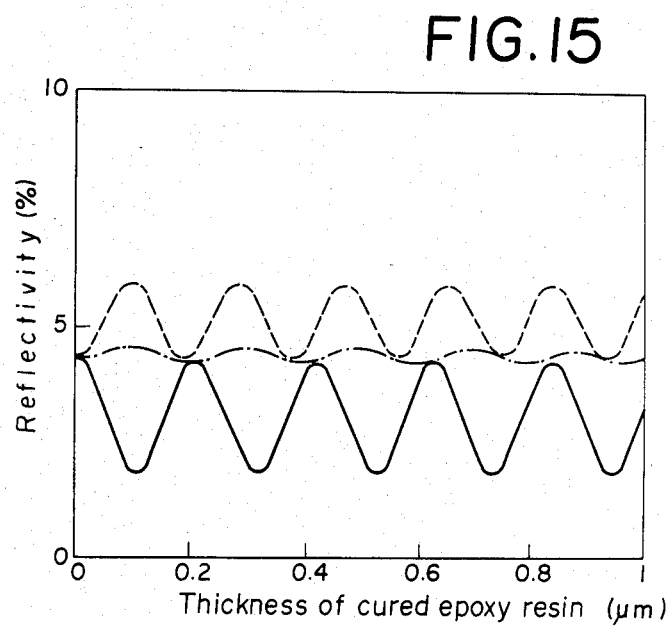
FIG. 15 is a graphic representation showing the change in reflectivity at the interface between air and the end face of the coated adhesive layer in terms of the thickness of the adhesive composition.

FIG. 14 shows a prism 13 coated with layers 14 which serves as films for the prevention of reflection or as protection films. The prism 13 is made of the BK7 glass and has surfaces over which the adhesive composition having a refractive index of $n^{23}=1.415$ which has been set forth as Run No. 5 in Example 3. The adhesive composition was coated on the surfaces of the prism, and then heated to be cured. Similar coating layers are formed over the surface of test prisms having the same shape and dimensions and made of the same material, for the comparison purpose, using the adhesives set forth in Run Nos. 6 and 7 in Example 3. FIG. 15 shows the influence of the thickness or depth of each adhesive composition on the reflectivity at the coated surface of the prism. In FIG. 15, the real line curve shows the reflectivity of the layer made of cured adhesive composition of Run No. 5, whereas the dotted line shows the result obtained by the use of the composition of Run No. 6 (solely using Epikote 828 as the epoxy resin component) and the dot-and-dash line curve shows the result obtained by the use of the commercially available adhesive as has been set forth as Run No. 8 in Example 3. It should be appreciated from the results illustrated in FIG. 15 and described in the foregoing description that the adhesive composition of the invention is superior in prevention of reflection.

Example 12

FIG. 16 is a view showing a portion of a generally cylindrical optical lens (produced and sold under the Trade Name SELFOC MICRO LENS by Nippon Ita Glass Co., Ltd.) A coating 14 of cured adhesive composition 14 is applied on one end face of a cylindrical optical lens 15, the end face being either of the face by which lights are received or the face from which lights are emitted. Anyway, the end face shown at the left side in FIG. 16 was coated with the adhesive composition of Run No. 5 of Example 3, the composition being prepared by mixing 100 parts by weight of DGDFO, 225 parts by weight of PFPA and 1 part by weight of BDMA. For the comparison purpose, similar coating layers are formed over the other lenses which are of same structure and quality and made of the same material as aforementioned, using the adhesive composition containing solely Epikote 828 and ordinary curing agent without containing a fluorinated compound (Run No. 6 of Example 3 set forth in Table 2) and using a commercially available adhesive (Run No. 7 of Example 3 set forth in Table 2). Each of the coating layers were heated to be cured. FIG. 17 shows the influence of the thickness or depth of the coated layer on the reflectivity at the end face of the cylindrical lens. The reflectivity was measured by using the D-line of sodium as the light source. In FIG. 17, the real line curve is for the coating made of the composition of Run No. 5, according to the invention, whereas the dotted line curve is for the coating made of the ordinary epoxy resin system without containing fluorine and the dot-and-dash line is for the coating made of the commercially available adhesive. It should be easily understood that the adhesive composition of the invention can be conveniently used for the protection of an end face of a cylindrical lens.

Example 13

Figure 18:
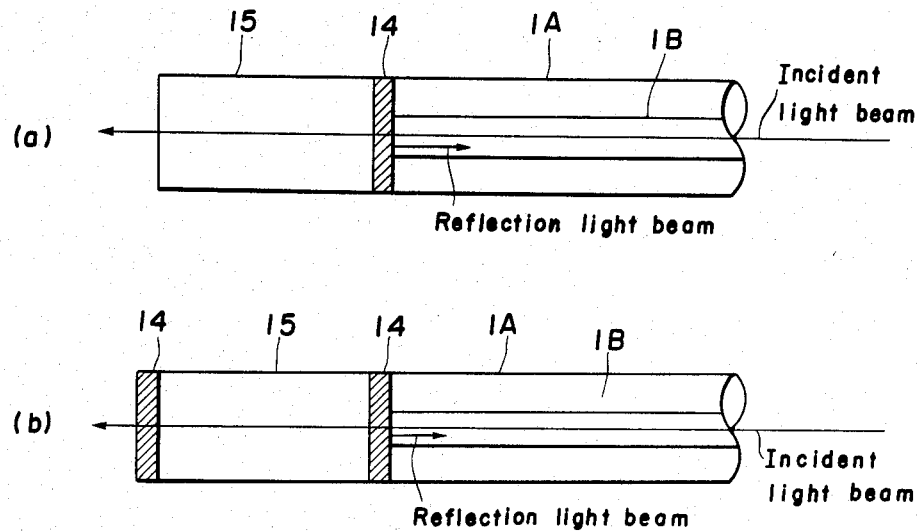
FIG. 18(a) and 18(b) are diagrammatical views showing generally cylindrical lenses and optical fiber systems joined together by means of an adhesive composition.

FIGS. 18 (a) and (b) are vies diagrammatically showing a junction of a cylindrical lens and an optical fiber, wherein a nylon coated and bare fiber is denoted by 1A and 1B. Reference numeral 14 in the Figure designates a cured adhesive composition and numeral 15 designates a cylindrical lens. As shown in FIG. 18(a), the cylindrical lens and the glass fiber were joined together using the adhesive composition of Run No. 1 of Example 3, an conventional epoxy base adhesive without containing fluorine, and a commercially available adhesive. Similarly as in the preceding Example 12, the reflectivity at the interface between the end face of the glass fiber and the end face of the cylindrical lens was measured for each of the cured adhesives. The results are shown in FIG. 19, wherein the real line curve is for the composition of Run No. 1 of Example 3, according to the invention, the dotted line is for the conventional epoxy resin base composition and the dot-and-dash line curve is for the commercially available other type adhesive. As will be seen from the results shown in FIG. 19 that the reflectivity at the joined interface can be extremely reduced by adjusting the thickness of the adhesive coating which is made of the cured composition according to the invention.

FIG. 18(b) shows a junction between an optical fiber and the protection coating for a cylindrical lens as illustrated in Example 12. Optical members excellent in matching of refractive index may be produced by using the adhesive composition of the invention as the protection film over the end face of a cylindrical lens and also using the same as an adhesive for joining the cylindrical lens with an end face of an optical fiber.

Example 14

Figure 20:
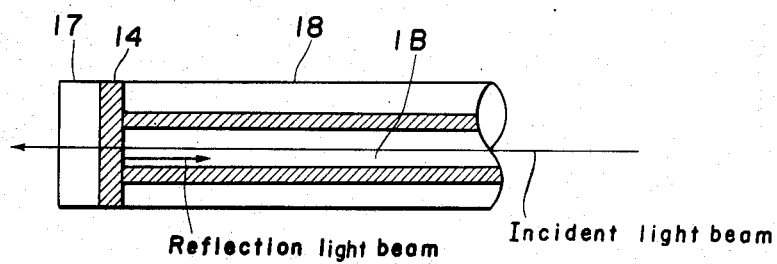
FIG. 20 is a diagrammatical view showing a glass fiber system having one end face coated with an adhesive composition.

FIG. 20 is a view showing the end face treatment at the end face of an optical fiber using an adhesive composition, wherein reference numeral 17 designates a glass plate. The glass fiber comprises a bare fiber 1B and a ferrule 18 surrounding the bare fiber 1B. The bare fiber 1B was fixed to the ferrule using the adhesive composition of Run No. 3 of Example 3. Thereafter, the end face of the bare fiber 1B was polished, and then the polished end face of the bare fiber 1B was joined with a glass plate made of BK7 glass using the aforementioned adhesive composition of the invention. The reflectivity at the junction was measured. The reflectivities of the tested samples were so low as less than 0.04% at the highest. Similar tests and measurements were repeated except in that the compositions of Run Nos. 6 and 7 were obtained same results. In the case of Run Nos. 6 and 7, the results were such that the maximum reflectivity reached 0.13%. As will be supported by the results of the tests, the noise signals otherwise entering into a laser diode can be suppressed substantially completely by the use of an adhesive composition of the invention, since it has extremely low reflectivity to hinder the reflection of the incident light back to the laser diode source substantially completely.

Although only a few embodiments of the adhesive composition of the invention have been referred in Example 9 to 14, similar advantageous results have been found by using other embodiments of the present invention.

What is claimed is:

1. A process for the production of optical members, comprising the steps of: preparing a mixture of a composition essentially containing a diglycidyl ether selected from the group consisting of diglycidyl ether of bisphenol-AF and diglycidyl ether of 2,2,3,3,4,4,5,5,6,6,7,7-dodecafluorooctane-1,8-diol; a reactive diluent selected from the group consisting of butyl glycidyl ether, phenyl glycidyl ether, allyl glycidyl ether, glycidyl ether of butane-diol and diglycidyl ether of 2,2,3,3,4,4,5,5,6,6,7,7-dodecafluorooctane-1,8-diol and 4-[perfluoro-1,3-dimethyl-2-(1-methylethyl)-1-butenyl-]-oxyphthalic anhydride acting as a hardener; defoaming said mixture; coating the defoamed mixture on an optical member; and then heating said member and said mixture coated thereon to harden said mixture.

* * * * *